(12) United States Patent
Goransson et al.

(10) Patent No.: US 10,428,897 B2
(45) Date of Patent: Oct. 1, 2019

(54) COMPRESSIBLE FLUID DEVICE COMPRISING SAFETY DEVICE AND METHOD OF PROTECTING A COMPRESSIBLE FLUID DEVICE

(71) Applicant: Stromsholmen AB, Tranas (SE)

(72) Inventors: Fredrik Goransson, Mantorp (SE);
Torbjorn Goransson, Sommen (SE)

(73) Assignee: Strömsholen AB, Tranas (SE)

( * ) Notice: Subject to any disclaimer, the term of this patent is extended or adjusted under 35 U.S.C. 154(b) by 0 days.

(21) Appl. No.: 15/567,158

(22) PCT Filed: Jun. 21, 2016

(86) PCT No.: PCT/EP2016/064312
§ 371 (c)(1),
(2) Date: Oct. 17, 2017

(87) PCT Pub. No.: WO2016/207160
PCT Pub. Date: Dec. 29, 2016

(65) Prior Publication Data
US 2018/0087596 A1    Mar. 29, 2018

(30) Foreign Application Priority Data

Jun. 26, 2015  (SE) ...................................... 1550892

(51) Int. Cl.
*F16F 9/512* (2006.01)
*F16F 9/02* (2006.01)
*F16F 9/43* (2006.01)

(52) U.S. Cl.
CPC ............ *F16F 9/512* (2013.01); *F16F 9/0218* (2013.01); *F16F 9/435* (2013.01); *F16F 2230/06* (2013.01); *F16F 2230/24* (2013.01)

(58) Field of Classification Search
CPC .......... F16F 9/0218; F16F 9/512; F16F 9/435; F16F 2230/24; F16F 9/0281
USPC ................................................. 188/376, 377
See application file for complete search history.

(56) References Cited

FOREIGN PATENT DOCUMENTS

| EP | 0959263 | | 7/2001 | |
|---|---|---|---|---|
| EP | 1241373 | | 9/2002 | |
| EP | 2177783 A2 | * | 4/2010 | ............ F16F 9/0218 |
| EP | 2634451 A1 | * | 9/2013 | ............... F16J 10/00 |
| EP | 3093133 A1 | * | 11/2016 | ........... B30B 15/288 |
| FR | 2821401 A1 | * | 8/2002 | ............ F16F 9/0218 |
| JP | S58-150642 | | 10/1983 | |
| JP | 2017227332 A | * | 12/2017 | ............ F16F 9/0272 |
| WO | WO-03042571 A1 | * | 5/2003 | ............ F16F 9/0281 |

* cited by examiner

Primary Examiner — Melanie Torres Williams
(74) Attorney, Agent, or Firm — Fay Sharpe LLP

(57) ABSTRACT

The present disclosure provides a compressible fluid device (1), such as a gas spring. The device comprises a casing (11) defining a compression chamber (12), a piston (15), which is movable in the chamber (12), and a safety member (2) placed in such a manner as to be struck by the piston (15) in the event of the piston overstriking, whereby at least some of the compressible fluid is evacuated from the compression chamber (12). The device further comprises a pre-strike member (25), that is arranged to be struck before the safety member (2) is struck, such that the safety member (2) is only struck once a predetermined overstroke force has been achieved.

38 Claims, 10 Drawing Sheets

COMPRESSIBLE FLUID DEVICE COMPRISING SAFETY DEVICE AND METHOD OF PROTECTING A COMPRESSIBLE FLUID DEVICE

TECHNICAL FIELD

The present disclosure relates to safety devices which are useful in compressible fluid devices, such as gas springs, dampers and pneumatic actuators.

The disclosure further relates to a method of preventing such safety devices from being triggered when they are not supposed to.

BACKGROUND

When forming products by deep drawing sheet metal, gas springs are used both to hold the metal sheet and to assist in separating tool halves from each other after a forming operation. Gas springs which support the sheet metal holder are loaded in the beginning of the press cycle and relieved afterwards. The extent to which each gas spring is loaded is determined by the press cycle, the form of the pressed product and of the effective stroke length. For the sheet metal forming operation to be optimal, it is necessary to have complete control of the press cycle.

There is a risk that the press cycle cannot be controlled in a satisfactory manner. Gas springs may be adversely affected in connection with an overstroke, i.e. a compression stroke that went too far, exceeding the nominal length of stroke of the gas spring. Such overstroke may cause damage to the parts making up the gas spring, including the cylinder, the piston rod, the piston and the guide, thus leading to reduced length of life, or at worst, rupture. Furthermore, and perhaps more seriously, press tools and other types of equipment may become damaged if gas springs are overstruck.

To avoid this type of problems, there are gas springs having safety devices, such as the ones disclosed in EP0959263B1 and EP1241373B1, where a safety plug is mounted in the bottom part of the cylinder.

However, with such safety plugs, situations may arise where the safety device is accidentally and unintentionally triggered. One such situation is where the gas springs are intentionally relieved of gas, e.g. in connection with service. The weight of the sheet metal holder may accidentally compress the empty or near empty gas spring such that it reaches its end position and triggers the overstroke protection.

Hence, there is a need for a safety device which is improved in this respect.

SUMMARY

A general object is thus to provide an improved safety device. In particular, it is an object to provide a safety device which has a reduced risk of becoming unintentionally triggered while still providing sufficient protection against overstrokes.

The invention is defined by the appended independent claims with embodiments being set forth in the appended dependent claims, in the following description and in the attached drawings.

According to a first aspect, there is provided a compressible fluid device, such as a gas spring, comprising a casing defining a compression chamber, a piston movable in the chamber, and a safety member in such a manner as to be struck by the piston in the event of the piston overstriking, whereby at least some of the compressible fluid is evacuated from the compression chamber. The device further comprises a pre-strike member, arranged to be struck before the safety member is struck by the piston, such that the safety member is only struck once a predetermined compressive overstroke force has been achieved.

A compressible fluid device may, as non-limiting examples, be a gas spring, a damper or a pneumatic piston.

By providing a pre-strike member, it is possible to prevent the safety device from triggering accidentally, e.g. in situations where the piston overstrikes. Such situations may occur when e.g. a gas spring is relieved of fluid pressure while still subjected to a load.

The pre-strike member may be arranged on the safety device, on the chamber wall or on the piston, as long as it is capable of receiving force from the piston before the safety device.

The safety member may extend inwardly from a chamber wall portion and the pre-strike member may extend further inwardly from the chamber wall than the safety member. In the illustrated examples, the safety member is provided in a bottom wall of the cylinder.

The pre-strike member may comprise a portion which is arranged to be deformed when struck with a predetermined force, and the safety member may be moveable relative to the chamber wall only when such deformation has been achieved.

The safety member may comprise a strike portion that is exposed in the compression chamber and a sealing portion, which, until the safety member has been struck, is arranged to prevent the compressible fluid from leaving the compression chamber.

The safety member may comprise a body, which is received in a safety channel that is provided in a chamber wall.

The body may be press fit in the safety channel.

Alternatively, or as a supplement, a play may be provided between the body and a wall of the safety channel.

Alternatively, or as a supplement, the body may be connected to the safety channel by a threaded connection.

The pre-strike member may be formed as a part which is separate from the safety member.

For example, the pre-strike member may be formed as a part which is attached to an inside of the chamber wall. Alternatively, or as a supplement, the pre-strike member may be formed as a part which is integrated with the inside of the chamber wall.

The pre-strike member may be integrated with the safety member.

The pre-strike member may be connected to the safety member by a material bridge.

The material bridge may extend about substantially the entire circumference of the safety member. Moreover, the material bridge may extend radially from the safety member to the pre-strike member.

The material bridge may have a thickness as seen in the axial direction, which varies between at least two different thicknesses.

The material bridge may connect to the pre-strike member at a portion of the pre-strike member that is closest to the chamber wall.

The material bridge may connect to the pre-strike member at a portion of the pre-strike member that is spaced from the chamber wall, such that a space is formed between the material bridge and the chamber wall when the pre-strike member is mounted in the chamber wall.

The safety member may further comprise an axially extending vent channel.

The vent channel may facilitate evacuation of the compression chamber once the safety member has been struck by providing a connection between the compression chamber and sealing member.

The vent channel extends through the material bridge and/or through the body.

The safety member further comprises an overpressure safety device, adapted to evacuate at least some of the fluid from the compression chamber in the event of a pressure in the compression chamber exceeding a predetermined maximum pressure.

The overpressure safety device may be arranged in connection with the vent channel.

Such an overpressure safety device may comprise a deformable or breakable portion of the safety device.

According to a second aspect, there is provided a method of protecting a compressible fluid device, such as a gas spring comprising a casing defining a compression chamber and a piston movable in the chamber. The method comprises in the event of the piston compressively overstriking, causing the piston to strike a safety member, such that the safety member causes at least some of the compressible fluid in the device to evacuate, causing a pre-strike member to be struck before the piston strikes the safety member, and causing the piston to strike the safety member only after a predetermined deformation or movement of the pre-strike member has been achieved.

DETAILED DESCRIPTION

FIGS. 1a-1d are schematic sectional views of a gas spring 1, which comprises a safety device 2, as will be further described below.

While reference is made to a gas spring, it is understood that the safety device of the present disclosure may find application also in other compressible fluid devices, such as dampers or pneumatic actuators. It is also conceivable that the present disclosure may find application in non-compressible fluid type applications, such as hydraulic cylinders.

The gas spring 1 comprises a casing 11 defining a compression chamber 12, a guide 13 which may be sealed relative to the casing 11 by a sealing device (not shown), such as an o-ring. A piston 15 is movably arranged in the compression chamber when subjected to a load 3. The casing 11 presents a substantially cylindrical side wall 111 and a bottom wall 112.

The operation of the gas spring 1 as such is conventional. That is, when the piston 15 is being pushed by a load 3 into the compression chamber 12, the fluid present therein is compressed, i.e. the "compression stroke". Once the load 3 is relieved, the piston 15 is pushed back out by the pressurized fluid, i.e. the "return stroke".

The piston 15 is moveable between an outer limit, which may be provided on the guide 13 and an inner limit, which may ultimately be provided by bottom wall.

The safety device 2 may be arranged in a recess 113, which is formed the bottom wall 112.

The safety device 2 is generally formed as a plug having a part that protrudes inwardly from a chamber wall, which is axially displaceable, typically outwardly, in the recess 113 when subjected to a sufficiently large axial load 3, as would be the case when an overstroke occurs.

Referring to FIGS. 2a-2d, the safety device 2 may comprise a safety device main body 20, a sealing holder 21, a sealing member 22 and an end plate 23. The safety device may comprise an axially extending vent channel 24.

The safety device 2 further comprises a pre-strike member 25.

The main body 20 may be formed as a substantially cylindrical member having a cross section which is adapted to fit with a cross section of the recess 113.

The main body 20 has a strike portion 201, which is arranged to protrude inwardly from the bottom wall 112 and to be struck by the piston 15 when the piston overstrikes.

The sealing holder 21 may be integrated with, e.g. formed in one piece with, the main body 20. The sealing holder may be provided in the form of a radially open circumferential groove, which is adapted to receive an O-ring 22 that is arranged to seal against a wall of the recess 113. The O-ring may be compressed when received between the sealing holder 21 and the wall of the recess 113.

At the axially outermost part of the safety device 2, there may be provided an end plate 23. The end plate 23 may form part of the sealing holder 21, e.g. by providing an axial limitation of the sealing holder 21, thus preventing the sealing member 22 from leaving the sealing holder 21.

Figure 3A:
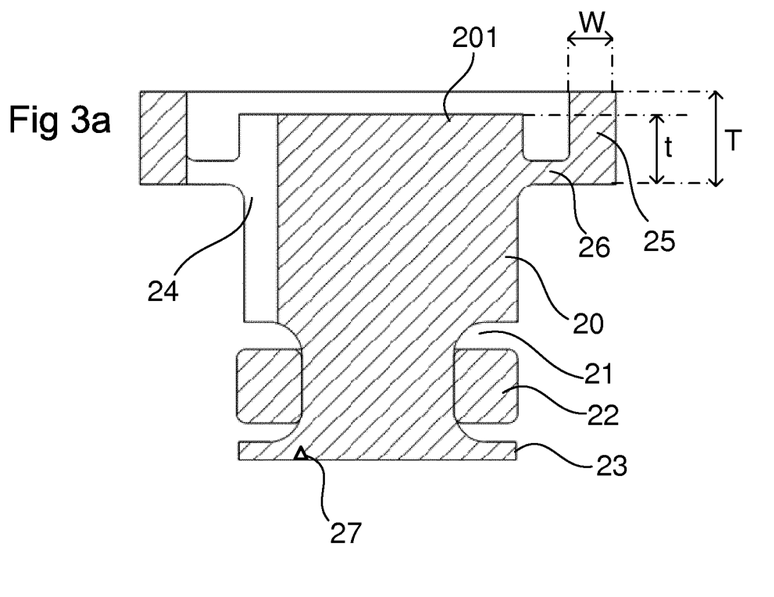
FIGS. 3a-3b are schematic sectional views of the safety device of FIGS. 2a-2d.

The end plate 23 may further be arranged to bend or break (shear off) if subjected to an overpressure, such that fluid from the compression chamber may escape in a controlled manner. For example, a rupture mark 27 may be provided as illustrated in FIG. 3a, such that the end plate, or part of it, will break at a predetermined location. However, such rupture marks are not necessary, as the mere design of the end plate may be such that it will yield (i.e. bend or shear off) at a predetermined location.

The vent channel 24 may be an axially extending channel which connects the compression chamber directly with the sealing member 22 and/or with the end plate 23, such that the sealing member 22 is subjected to the pressure of the compression chamber and thus can be triggered in case of excessive pressure.

The pre-strike member 25 is here provided in the form of a ring, which is integrated with the main body 20 of the safety device 2.

The pre-strike member 25 presents an axial extent T, which is greater than an axial extent t of the strike portion 201. That is, the pre-strike member 25 extends further into the compression chamber than the strike portion does, such that, in the event of an overstroke, the piston 15 will strike the pre-strike member before it strikes the strike portion 201.

The pre-strike member 25 may be formed of a material and with a geometry that together are designed to yield when subjected to a force exceeding a predetermined value. In the disclosed example, which is non-limiting, the pre-strike member is formed as a ring having an axial thickness T and a radial width W, which are selected such that the ring will yield when the piston (or part of the piston) strikes the ring at a predetermined force.

The pre-strike member 25 need not be formed as a ring. For example, it may be formed of one or more linear or curved material segments. It may be formed of an axially and/or radially crenelated or wavy structure.

The pre-strike member may be formed on the end wall portion of the cylinder, as disclosed in the drawings. As an alternative, it may be formed on a cylindrical wall portion or at a transition between the cylindrical wall portion and the end wall portion.

As another option, the pre-strike member may be formed on the safety device.

As yet another option, the pre-strike member may be formed on the piston, such that it will contact a wall portion and begin to receive force before the safety member is struck by the piston.

FIG. 3a schematically illustrates a cross section of the safety device 2, which cross section is taken at the vent channel 24.

Figure 3B:
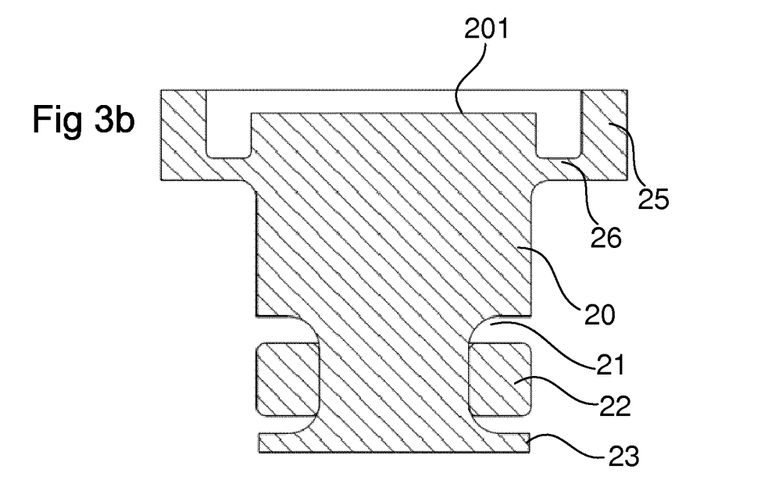

FIG. 3b schematically illustrates a cross section taken at a plane which is angularly spaced from the vent channel 24.

Referring to FIGS. 3a and 3b, the pre-strike member 24 is attached to the main body 20 by a radial material bridge 26. This material bridge may extend over the entire circumference of the main body 20, or over part thereof.

Referring again to FIGS. 1a-1b, FIG. 1a illustrates the gas spring 1 in a state before the piston 15 has reached the safety device 2. At this point, the piston 15 may be pushed towards its retracted position by the load 3

Figure 1A:
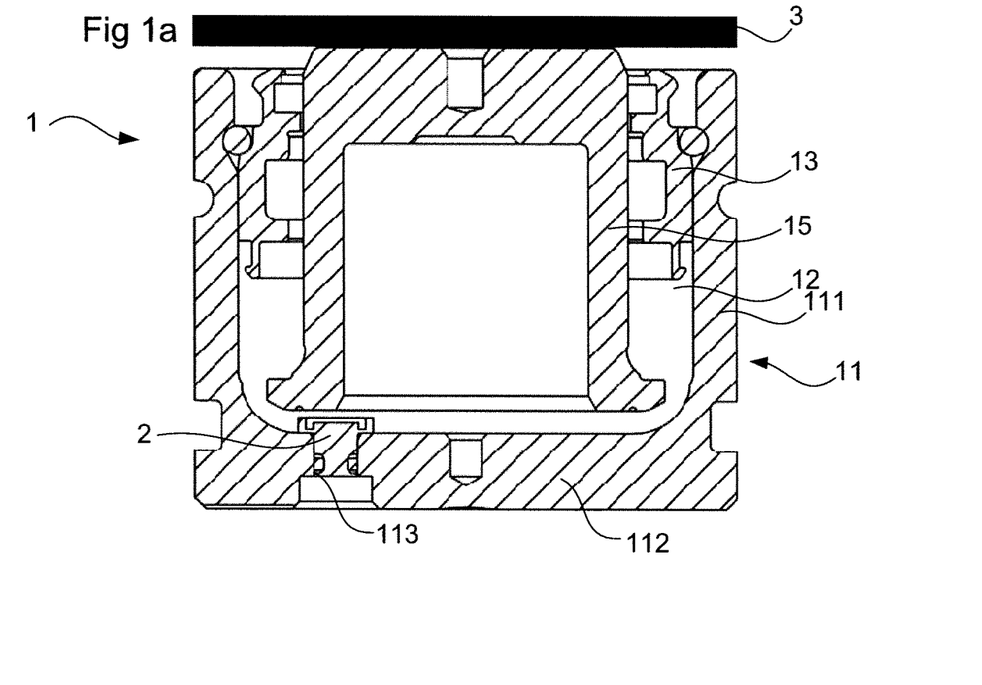
FIGS. 1a-1d are schematic sectional views of a gas spring, which illustrate the design and operation of the safety device concept of the present disclosure.
Figure 1B:
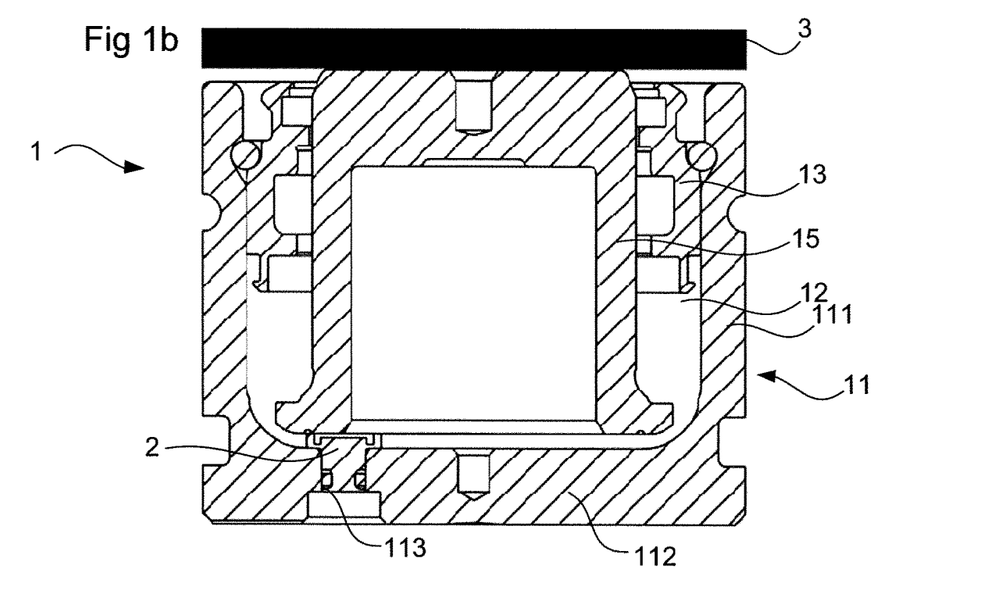
Figure 4A:
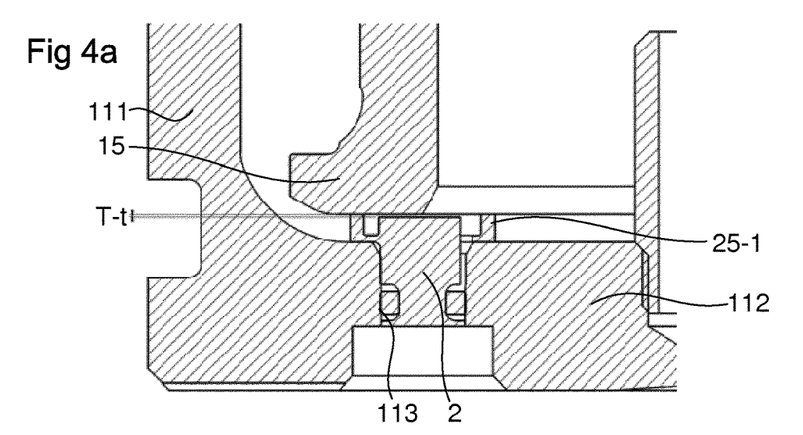
FIGS. 4a-4c are schematic sectional views showing, in more detail, the operation of the safety device concept of the present disclosure.

FIG. 1b illustrates the gas spring 1 in a state when the piston 15 has made contact with the pre-strike member 25-1 of the safety device 2. As is illustrated, and more clearly so in FIG. 4a, there is an axial space (T-t) between the piston 15 and the strike portion 201 of the safety device.

Figure 1C:
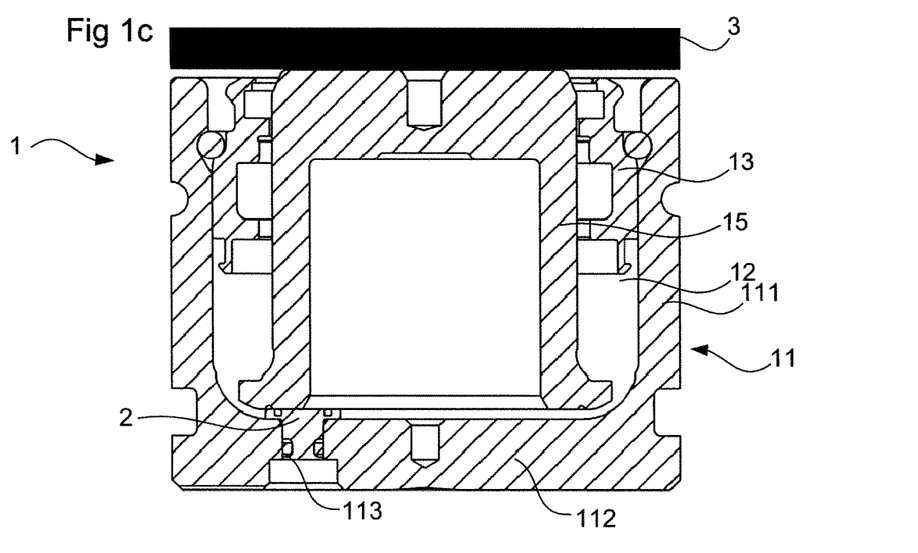
Figure 4B:
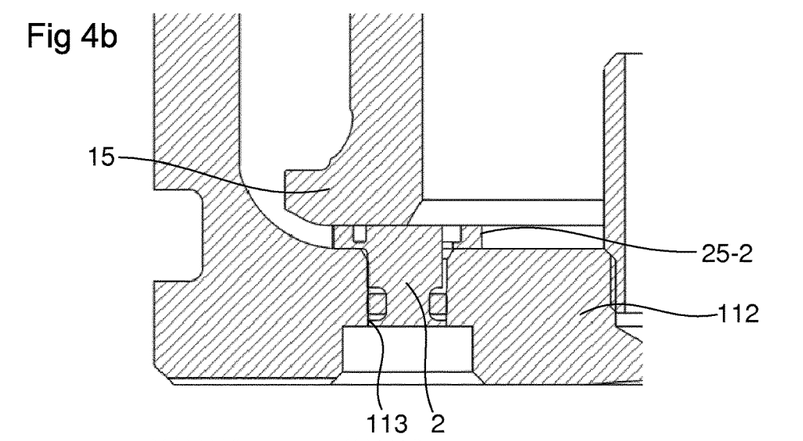

FIG. 1c and FIG. 4b illustrate the gas spring 1 in a state when the pre-strike member 25-2 has begun to yield to such an extent that initial contact is made between the piston 15 and the strike portion 201 of the safety device main body 20. The pre-strike member 25-2 has thus been somewhat compressed.

Figure 1D:
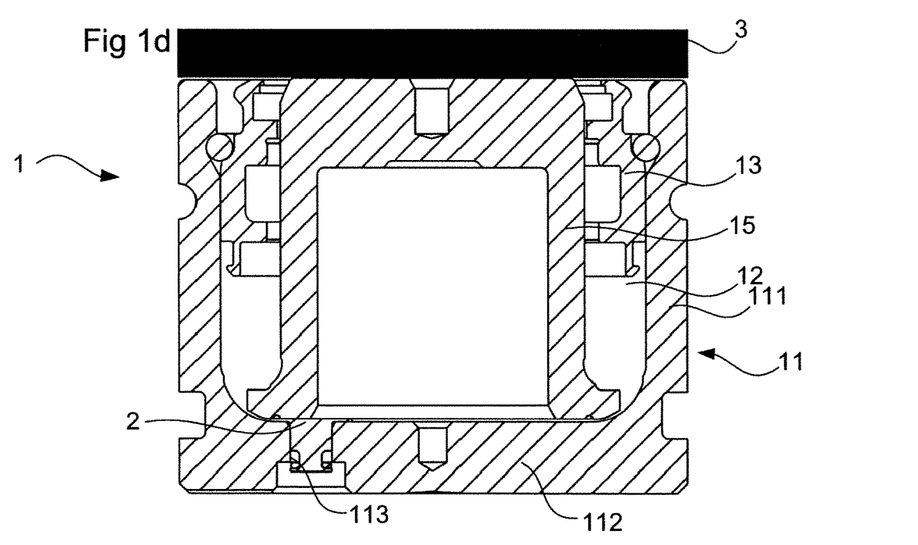
Figure 2A:
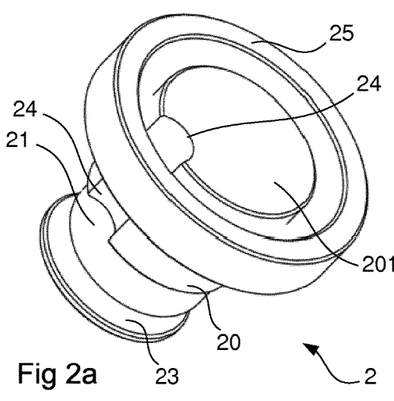
FIGS. 2a-2d are schematic perspective views of a safety device.
Figure 2B:
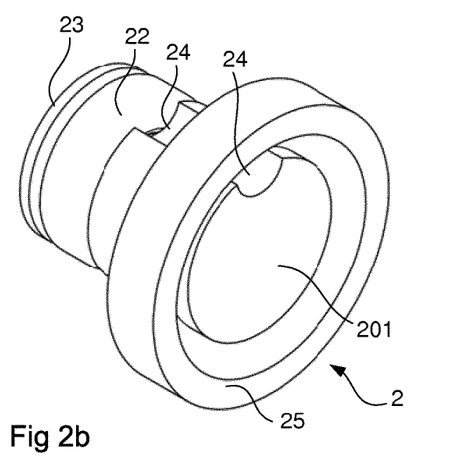
Figure 2C:
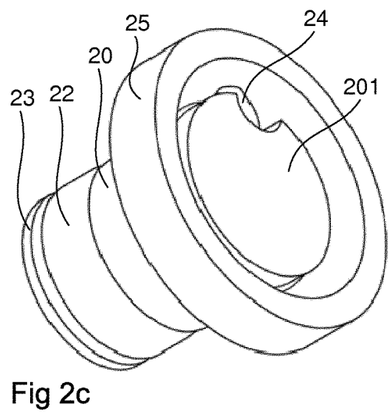
Figure 2D:
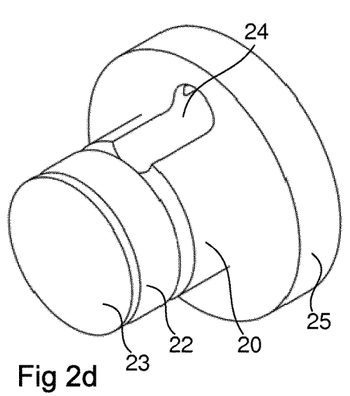
Figure 4C:
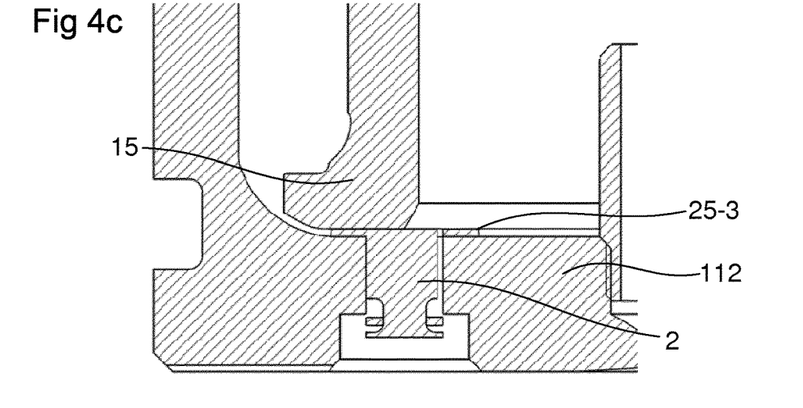

FIGS. 1d and FIG. 4c illustrate the gas spring 1 in a state when the safety device 2 has been axially displaced by the piston 15 to such an extent as to allow the fluid in the compression chamber to evacuate. In this illustrated example, the entire sealing member 22 has been pushed out of the recess 113. The gas can thus escape through the vent channel 24 and past the sealing member 22. The pre-strike member 25-3 has been fully compressed.

Hence, once the pre-strike member yields to a sufficient extent, the strike portion 201 will be struck by the piston 15 and the safety device will be triggered when the main body 20 has performed a sufficient axial motion in the recess 113 to push the sealing member 22 outside an outer limit of the recess 113.

Figure 5:
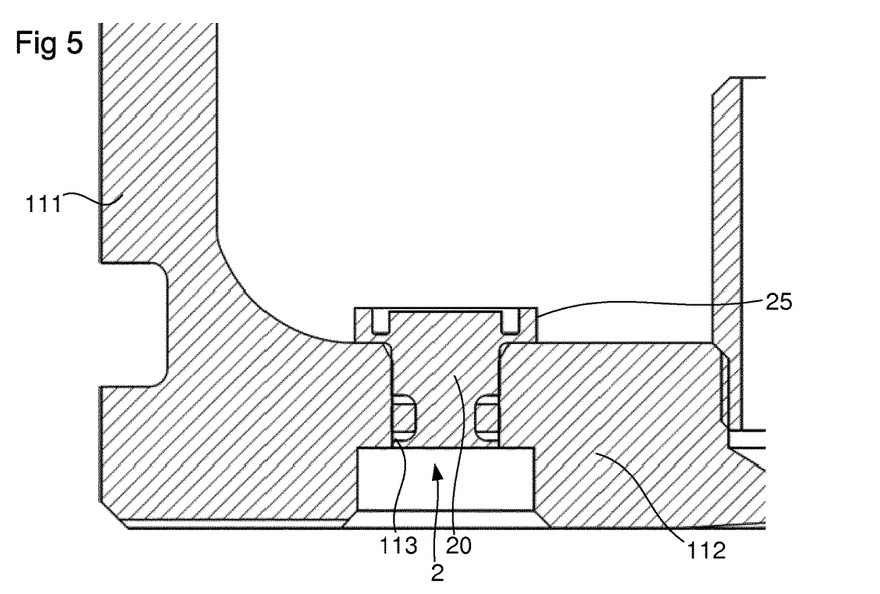
FIG. 5 is a schematic sectional view showing a first design of a safety device.

FIG. 5 schematically illustrates the safety device 2 previously discussed in a magnified cross sectional view. In this embodiment, the main body 20 of the safety device may be press fit into the recess 113. That is, where the body and the recess 113 are cylindrical, a diameter of the body 20 may be equal to or slightly larger than, a diameter of the recess 113. The sealing member 22 may in this embodiment have an even greater diameter than the body 20.

The safety device 2 is mounted from the inside of the gas spring 2, which means that to replace it, it is necessary to dismantle the gas spring 1.

Figure 6:
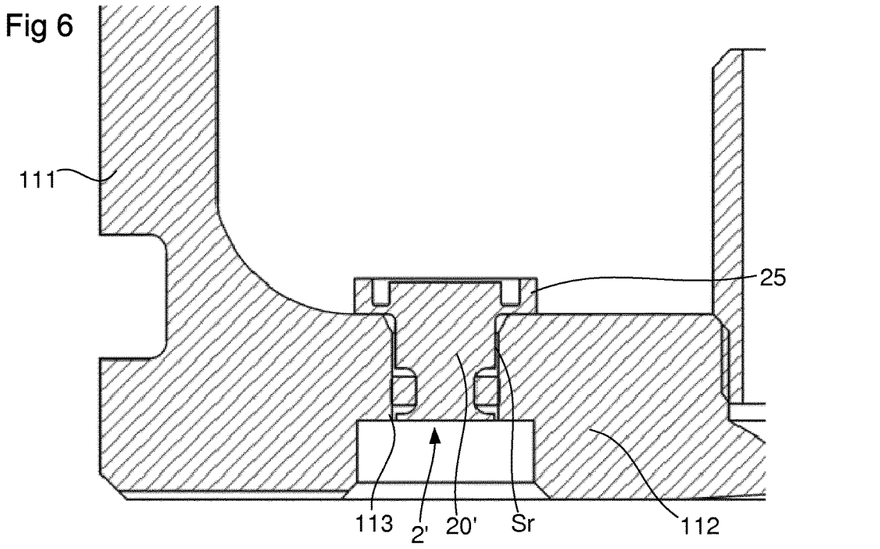
FIG. 6 is a schematic sectional view showing a second design of a safety device.

FIG. 6 schematically illustrates a safety device 2' according to a first alternative embodiment. In this embodiment, there is a radial gap Sr between the body 20' and the wall of the recess 113. The sealing member 22 may have an outer diameter which is greater than that of the recess 113. Hence, the safety device 2' may be held by the frictional force provided between the sealing member 22 and the recess 113, and by the pre-strike member 25 and its related material bridge 26.

The safety device 2' is mounted from the inside of the gas spring 1.

Figure 7:
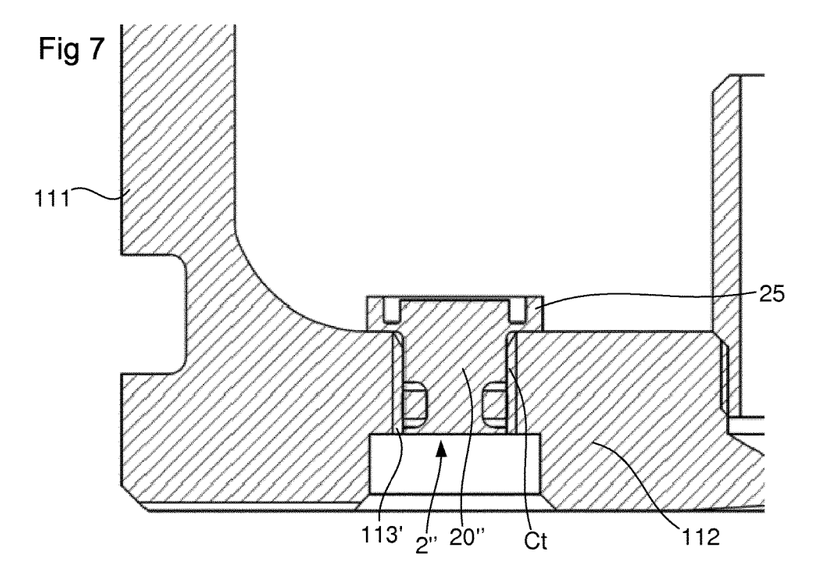
FIG. 7 is a schematic sectional view showing a third design of a safety device.

FIG. 7 schematically illustrates a safety device 2" according to a second alternative embodiment. In this embodiment, the safety device is connected to the recess by a threaded connection Ct. Hence, the main body 20" of the safety device 2" may be provided with a male thread and the wall of the recess 113' may be provided with a female thread. The threads are designed to be sheared off when the safety device 2" is subjected to a sufficient axial load, such that the safety device is axially displaced partially out of the recess 113'.

Also in this embodiment, the safety device 2" is mounted from the inside of the gas spring 1.

Figure 8:
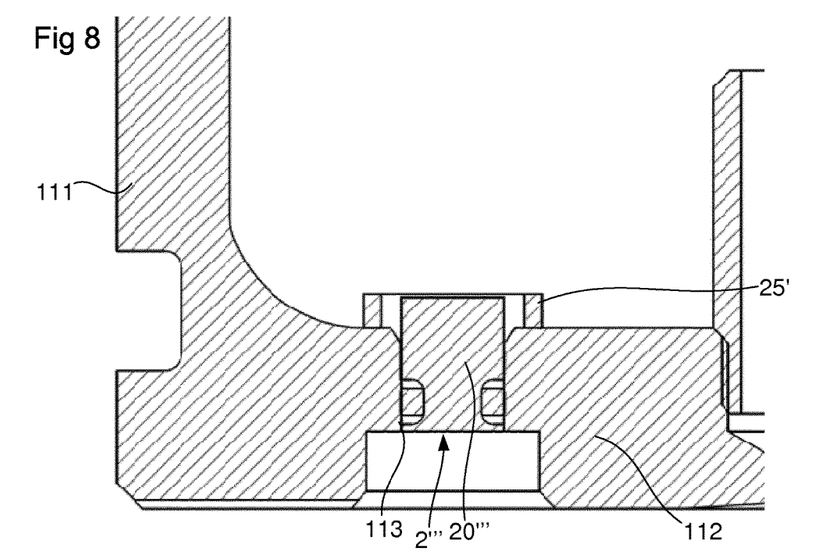
FIG. 8 is a schematic sectional view showing a fourth design of a safety device.

FIG. 8 schematically illustrates a safety device 2''' according to a third embodiment. In this embodiment, the main body 20''' of the safety device 2'''may be press fit into the recess 113, as described with respect to FIG. 5. In this embodiment, the pre-strike member 25' is provided as a separate part, which may be attached to, or formed in one piece with, an inside of the wall 11, Hence, this safety device 2''' may be mounted from the inside or from the outside.

Figure 9:
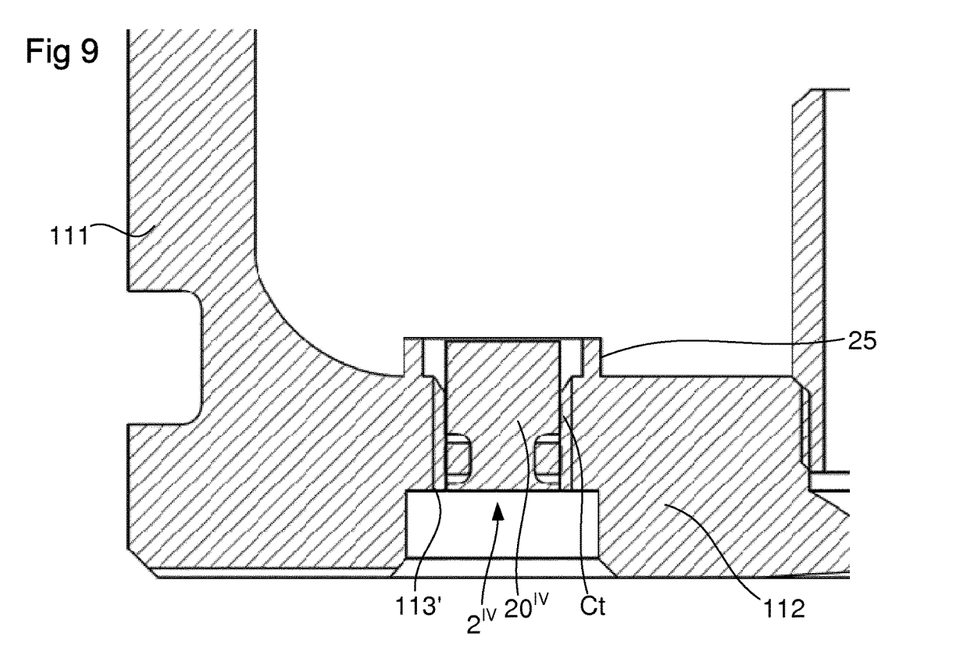
FIG. 9 is a schematic sectional view showing a fifth design of a safety device.

FIG. 9 schematically illustrates a safety device $2^{IV}$ according to a fourth embodiment. In this embodiment, the main body is attached to the recess 113' by a threaded connection Ct, as described with respect to FIG. 7. The pre-strike member is also provided as a separate part, which may be attached to, or formed in one piece with, an inside of the wall 11, Hence, this safety device $2^{IV}$ may be mounted from the inside or from the outside.

Figure 10A:
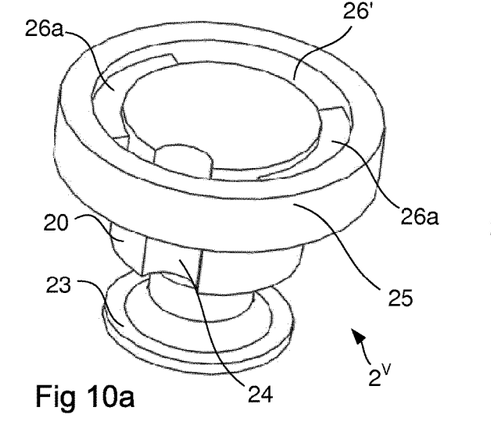
FIGS. 10a-10c schematically illustrate another design of the connection between the safety device and the pre-strike member.
Figure 10B:
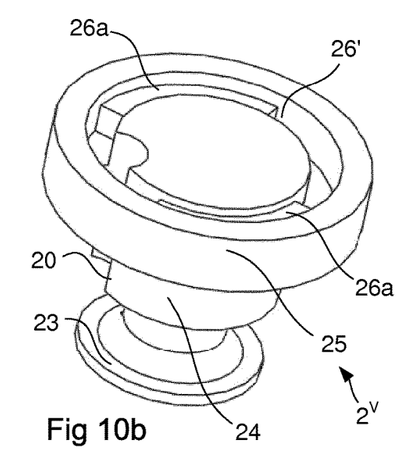
Figure 10C:
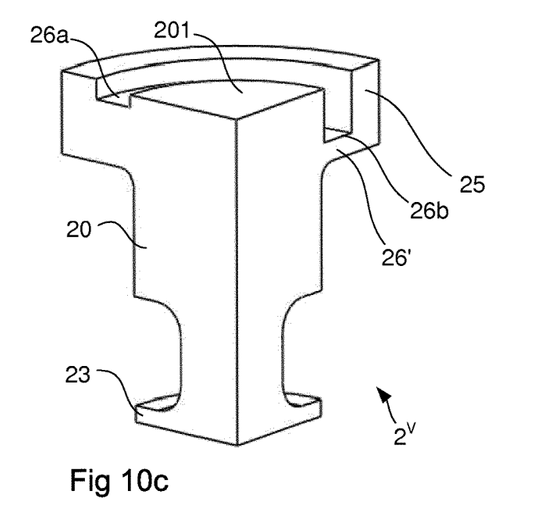

FIGS. 10a-10c schematically illustrate an embodiment of a safety device $2^{V}$, wherein the material bridge 26' presents a varying thickness. In the embodiment illustrated, the material bridge presents a pair of diametrically opposite portions 26a having greater thickness and another pair of diametrically opposite portions 26b having a smaller thickness. The pairs of portions 26a, , 26b may be arranged perpendicular to each other.

In the alternative, the material bridge 26' may have a continuously varying thickness, such as a wave form, as seen along its circumference.

As yet another option, the material bridge may be formed as one or more bridge portions, each of which extend over only a part of the circumference of the body 20.

It is understood that the material bridge 26' design discussed with respect to FIGS. 10a-10c may be combined with any of the designs of the body 20, 20', 20", 20''', $20^{IV}$ and its attachment mechanism to the wall 11.

Figure 11A:
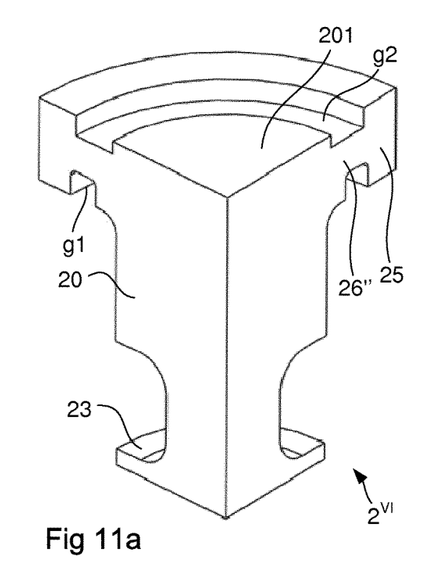
FIGS. 11a-11b schematically illustrate yet another design of the connection between the safety device and the pre-strike member.
Figure 11B:
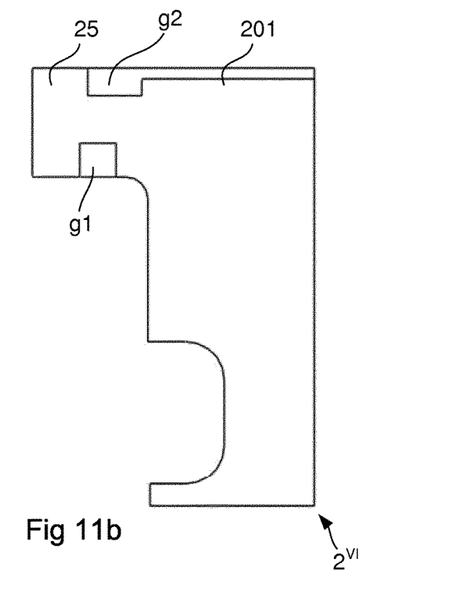

FIGS. 11a-11b schematically illustrate an embodiment of a safety device $2^{VI}$, wherein the material bridge 26" is spaced from a portion of the pre-strike member 25 that is closest to the wall 11, such that a space is formed between the wall and the material bridge 26".

In other words, there is formed a lower annular groove g1 on a side of the material bridge 26" that is to face the wall 112 of the gas spring 1.

Moreover, there is formed an upper annular groove g2 on a side of the material bridge 26" that is to be exposed in the compression chamber 12.

The annular grooves g1, g2 may present different axial depths and/or different radial widths.

It is understood that the material bridge 26" design discussed with respect to FIGS. 11a-11b may be combined with any of the designs of the body 20, 20', 20", 20''', $20^{IV}$ and its attachment mechanism to the wall 11. It is also understood that the material bridge 26" discussed with respect to FIGS. 11a-11b and FIG. 12 may be provided with a varying thickness as discussed with respect to FIGS. 10a-10c.

Figure 12:
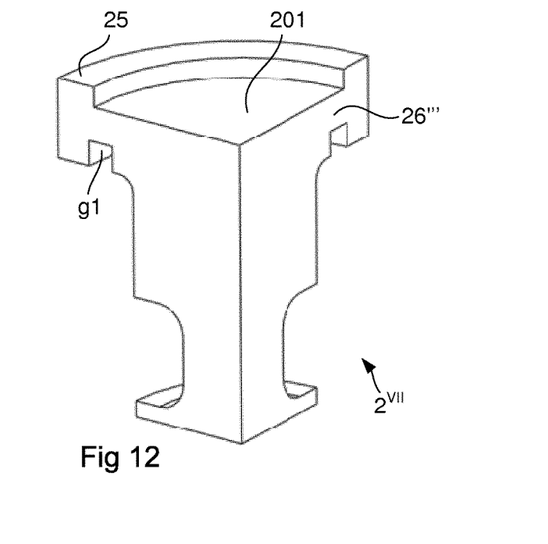
FIG. 12 schematically illustrates yet another design of the connection between the safety device and the pre-strike member.

FIG. 12 schematically illustrates an embodiment of a safety device $2^{VII}$, wherein the material bridge 26''' is spaced from a portion of the pre-strike member 25 that is closest to the wall 11, such that an annular groove g1 is formed between the wall 11 and the material bridge 26'''. In the embodiment of FIG. 12, there is no upper groove g2 (as in FIGS. 11a-11b) and thus the upper side of the material bridge 26''' is flush with the strike portion 201.

It is understood that the material bridge 26''' design discussed with respect to FIG. 12 may be combined with any of the designs of the body 20, 20', 20", 20''', $20^{IV}$ and its attachment mechanism to the wall 11. It is also understood that the material bridge 26''' discussed with respect to Fig may be provided with a varying thickness as discussed with respect to FIGS. 10a-10c. The material bridge design 26''' discussed with respect to FIG. 12 may also be provided with a varying thickness as discussed with respect to FIGS. 10a-10c.

The safety device and the pre-strike member' 25 may be formed of the same material. The material may be a metallic material, such as steel or aluminum, or a polymeric material.

In the alternative, the safety device and the pre-strike member may be formed of different materials, such as different metallic or polymeric materials, or one of metallic and the other of polymeric, material.

Safety devices may be adapted to trigger when subjected to piston forces of about 3000 N to about 300000 N, depending on the size of the compressible fluid device.

The invention claimed is:

1. A compressible fluid device comprising:
   a casing defining a compression chamber,
   a piston movable in the chamber,
   a safety member placed in such a manner as to be struck by the piston in the event of the piston overstriking, whereby at least some of the compressible fluid is evacuated from the compression chamber after the safety member is struck by the piston, and
   a pre-strike member, the pre-strike member positioned in said chamber and arranged to be struck before the safety member is struck by the piston, the safety member is only struck once a predetermined compressive overstroke force has been applied by the piston to the pre-strike member to cause the pre-strike member to at least partially deform thereby allowing the piston to strike the safety member after the at least partial deformation of the pre-strike member.

2. The device as claimed in claim 1, wherein the safety member extends inwardly from a chamber wall portion and wherein the pre-strike member extends further inwardly from the chamber wall than the safety member.

3. The device as claimed in claim 1, wherein the pre-strike member comprises a portion which is arranged to be deformed when struck with a predetermined force, whereby the safety member is moveable relative to the chamber wall only when a certain degree of deformation has been achieved.

4. The device as claimed in claim 1, wherein the safety member comprises a strike portion that is exposed in the compression chamber and a sealing portion, which, until the safety member has been struck, is arranged to prevent the compressible fluid from leaving the compression chamber.

5. The device as claimed in claim 1, wherein safety member comprises a body, which is received in a safety channel that is provided in a chamber wall.

6. The device as claimed in claim 1, wherein the pre-strike member-is formed as a part which is separate from the safety member.

7. The device as claimed in claim 1, wherein the pre-strike member is integrated with the safety member.

8. The device as claimed in claim 1, wherein the pre-strike member is connected to the safety member by a material bridge.

9. The device as claimed in claim 8, wherein the material bridge extends about substantially the entire circumference of the safety member.

10. The device as claimed in claim 8, wherein the material bridge has a thickness as seen in the axial direction, which varies between at least two different thicknesses.

11. The device as claimed in claim 8, wherein the material bridge connects to the pre-strike member at a portion of the pre-strike member that is closest to the chamber wall.

12. The device as claimed in claim 8, wherein the material bridge connects to the pre-strike member at a portion of the pre-strike member that is spaced from the chamber wall, such that a space is formed between the material bridge and the chamber wall when the pre-strike member is mounted in the chamber wall.

13. The device as claimed in claim 1, wherein the safety member further comprises an axially extending vent channel.

14. The device as claimed in claim 1, wherein the vent channel extends through the material bridge and/or through the body.

15. The device as claimed in claim 1, wherein the safety member further comprises an overpressure safety device, adapted to evacuate at least some of the fluid from the compression chamber in the event of a pressure in the compression chamber exceeding a predetermined maximum pressure.

16. A compressible fluid device in the form of a spring comprising:
   a casing defining a compression chamber;
   a piston movable in the compression chamber;
   a safety member positioned in the chamber in such a manner that at least a portion of the safety member is struck by the piston in the event of the piston overstriking, the safety member configured to release at least a portion of compressible fluid in the chamber after the safety member has been struck by the piston; and, a pre-strike member positioned in the compression chamber in such a manner as to be struck by the piston prior to the safety member being struck by the piston in the event of the piston overstriking, the pre-striking member configured to be at least partially deformed by the piston prior to the piston being able to contact the safety member.

17. The device as defined in claim 16, wherein the safety member extends inwardly from an interior portion of a chamber wall of the compression chamber and wherein the pre-strike member extends further inwardly from the chamber wall than the safety member.

18. The device as claimed in claim 16, wherein the safety member comprises a strike portion and a sealing portion, the strike portion extends inwardly from a chamber wall of the compression chamber and is exposed in the compression chamber, the sealing portion is configured to prevent the compressible fluid from leaving the chamber until the strike portion has been struck by the piston.

19. The device as claimed in claim 17, wherein the safety member comprises a strike portion and a sealing portion, the strike portion extends inwardly from the chamber wall of the compression chamber and is exposed in the compression chamber, the sealing portion is configured to prevent the compressible fluid from leaving the chamber until the strike portion has been struck by the piston.

20. The device as defined in claim 16, wherein the pre-strike member is formed as a part which is separate from the safety member.

21. The device as defined in claim 17, wherein the pre-strike member is formed as a part which is separate from the safety member.

22. The device as defined in claim 20, wherein the pre-strike member is connected to the chamber.

23. The device as defined in claim 21, wherein the pre-strike member is connected to the chamber.

24. The device as defined in claim 16, wherein the pre-strike member is integrated with the safety member.

25. The device as defined in claim 17, wherein the pre-strike member is integrated with the safety member.

26. The device as claimed in claim 24, wherein the pre-strike member is connected to the safety member by a material bridge, the material bridge a) extends about substantially the entire circumference of the safety member, b) has a thickness as seen in the axial direction, which varies between at least two different thicknesses, c) connects to the pre-strike member at a portion of the pre-strike member that is closest to the chamber wall, and/or d) connects to the pre-strike member at a portion of the pre-strike member that is spaced from the chamber wall, such that a space is formed between the material bridge and the chamber wall when the pre-strike member is mounted in the chamber wall.

27. The device as claimed in claim 25, wherein the pre-strike member is connected to the safety member by a material bridge, the material bridge a) extends about substantially the entire circumference of the safety member, b) has a thickness as seen in the axial direction, which varies between at least two different thicknesses, c) connects to the pre-strike member at a portion of the pre-strike member that is closest to the chamber wall, and/or d) connects to the pre-strike member at a portion of the pre-strike member that is spaced from the chamber wall, such that a space is formed between the material bridge and the chamber wall when the pre-strike member is mounted in the chamber wall.

28. The device as claimed in claim 16, wherein the safety member further comprises an overpressure safety device that is configured to evacuate at least some of the fluid from the compression chamber in the event of a pressure in the chamber exceeding a predetermined maximum pressure, said safety member further including an axially extending vent channel.

29. The device as claimed in claim 17, wherein the safety member further comprises an overpressure safety device that is configured to evacuate at least some of the fluid from the compression chamber in the event of a pressure in the chamber exceeding a predetermined maximum pressure, said safety member further including an axially extending vent channel.

30. A method of protecting a compressible fluid device in the form of a spring, the method comprising:

providing the compressible fluid device, the compressible fluid device including:
    a casing defining a compression chamber;
    a piston movable in the compression chamber;
    a compressible fluid in the compression chamber;
    a safety member positioned in the chamber in such a manner that at least a portion of the safety member is struck by the piston in the event of the piston overstriking, the safety member configured to release at least a portion of compressible fluid in the chamber after the safety member has been struck by the piston; and,
    a pre-strike member positioned in the compression chamber in such a manner as to be struck by the piston prior to the safety member being struck by the piston in the event of the piston overstriking, the pre-striking member configured to be at least partially deformed by the piston prior to the piston being able to contact the safety member;

causing the piston to strike the pre-strike member in the event of the piston compressively overstriking;

causing the pre-strike member to deform when the piston strikes the pre-strike member with a predetermined overstrike force; and, causing the piston to strike the safety member only after the piston has caused deformation of the pre-strike member, the striking of the safety member by the piston resulting in at least partial release of the compressible fluid from the compression chamber.

31. The method as defined in claim 30, wherein the striking of the pre-strike member by the piston with a force that is less than the predetermined overstrike force results in insufficient deformation of the pre-strike member to enable the piston to contact or strike the safety member and cause the safety member to release the compressible fluid from the compression chamber.

32. The method as defined in claim 30, wherein the safety member extends inwardly from an interior portion of a chamber wall of the compression chamber and wherein the pre-strike member extends further inwardly from the chamber wall than the safety member.

33. The method as defined in claim 30, wherein the safety member comprises a strike portion and a sealing portion, the strike portion extends inwardly from a chamber wall of the compression chamber and is exposed in the compression chamber, the sealing portion is configured to prevent the compressible fluid from leaving the chamber until the strike portion has been struck by the piston.

34. The method as defined in claim 30, wherein the pre-strike member is formed as a part which is separate from the safety member.

35. The method as defined in claim 34, wherein the pre-strike member is connected to the chamber.

36. The method as defined in claim 30, wherein the pre-strike member-is integrated with the safety member.

37. The method as defined in claim 36, wherein the pre-strike member is connected to the safety member by a material bridge, the material bridge a) extends about substantially the entire circumference of the safety member, b) has a thickness as seen in the axial direction, which varies between at least two different thicknesses, c) connects to the pre-strike member at a portion of the pre-strike member that is closest to the chamber wall, and/or d) connects to the pre-strike member at a portion of the pre-strike member that is spaced from the chamber wall, such that a space is formed between the material bridge and the chamber wall when the pre-strike member is mounted in the chamber wall.

38. The method as defined in claim 30, wherein the safety member further comprises an overpressure safety device that is configured to evacuate at least some of the fluid from the compression chamber in the event of a pressure in the chamber exceeding a predetermined maximum pressure, said safety member further including an axially extending vent channel.

* * * * *